United States Patent
Jung et al.

(10) Patent No.: US 9,559,368 B2
(45) Date of Patent: Jan. 31, 2017

(54) FUEL CELL SYSTEM HAVING EJECTOR

(71) Applicant: Hyundai Motor Company, Seoul (KR)

(72) Inventors: Sekwon Jung, Seongnam-si (KR); Yong Gyu Noh, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 321 days.

(21) Appl. No.: 14/290,736

(22) Filed: May 29, 2014

(65) Prior Publication Data

US 2015/0171443 A1   Jun. 18, 2015

(30) Foreign Application Priority Data

Dec. 17, 2013   (KR) .................. 10-2013-0157584

(51) Int. Cl.
*H01M 8/04*   (2016.01)

(52) U.S. Cl.
CPC ..... *H01M 8/04164* (2013.01); *H01M 8/04097* (2013.01); *H01M 8/04201* (2013.01); *H01M 2220/20* (2013.01); *Y02E 60/50* (2013.01)

(58) Field of Classification Search
CPC .............. H01M 8/04097; H01M 8/04164; H01M 8/04201
USPC ....................................... 429/414
See application file for complete search history.

(56) References Cited

U.S. PATENT DOCUMENTS

| 2010/0227230 A1* | 9/2010 | Goebel | H01M 8/04097 |
| | | | 429/414 |
| 2011/0189552 A1* | 8/2011 | Garnit | H01M 8/04097 |
| | | | 429/410 |
| 2012/0270118 A1 | 10/2012 | Goebel et al. | |
| 2013/0095397 A1* | 4/2013 | Fukuma | B01F 5/0413 |
| | | | 429/414 |

FOREIGN PATENT DOCUMENTS

| JP | 2003-288924 A | 10/2003 |
| JP | 2009-129814 A | 6/2009 |

* cited by examiner

*Primary Examiner* — Basia Ridley
*Assistant Examiner* — James Erwin
(74) *Attorney, Agent, or Firm* — McDermott Will & Emery LLP

(57) ABSTRACT

A fuel cell system having an ejector includes a stack for generating electricity by using air and fuel gas being supplied thereto. A fuel gas circulating line re-circulates the fuel gas from an outlet of the stack to an inlet of the stack. An ejector is mounted to the fuel gas circulating line for supplying fresh fuel gas and circulating the fuel gas. The ejector includes a vacuum suction pipe having one side connected to the fuel gas re-circulating line and a fuel gas spray nozzle mounted to the vacuum suction pipe for spraying the fuel gas to form a vacuum. An inner housing through which the fuel gas sprayed from the fuel gas spray nozzle passes. An outer housing is arranged on an outside of the inner housing to construct a condensed water space with the inner housing. The inner housing drains water from an inside of the inner housing to the condensed water space.

10 Claims, 3 Drawing Sheets

FUEL CELL SYSTEM HAVING EJECTOR

CROSS-REFERENCE TO RELATED APPLICATION

This application claims the benefit of priority to Korean Patent Application No. 10-2013-0157584 filed in the Korean Intellectual Property Office on Dec. 17, 2013, the entire contents of which are incorporated herein by reference.

TECHNICAL FIELD

The present disclosure relates to a fuel cell system having an ejector for stable supply of fuel gas and moisture to a stack which generates electrical energy by using the fuel gas and air for stable generation of electricity.

BACKGROUND

As known, a fuel cell vehicle provided with a fuel cell system mounted thereto supplies hydrogen which is used as fuel to a fuel cell stack for generating electricity to drive an electric motor which drives the vehicle. In this case, the fuel cell system is an electric power system which does not convert chemical energy of the fuel to heat by combustion but directly converts electrochemical energy to electrical energy within a fuel stack.

In the fuel cell system, high purity hydrogen is supplied to a fuel pole (anode) of the fuel cell from a hydrogen storage tank, and atmospheric air is supplied to an air pole (cathode) of the fuel cell by using an air supply unit, such as an air blower, during operation.

According to the related art, the hydrogen supplied to the fuel cell stack is separated into a hydrogen ion and an electron by catalyst at the fuel pole (anode), and the hydrogen ion separated thus passes through a polymer electrolyte membrane to the air pole (cathode) such that oxygen supplied to the air pole couples to the electron which comes to the air pole through an external lead line to generate the electrical energy while producing water. A membrane electrode assembly (MEA) of the fuel stack needs to have an appropriate amount of moisture maintained thereon, and a humidifier mounted to each of a fuel gas circulating line and an air circulating line circulate the stack to operate the stack.

In order to circulate the fuel gas in the fuel system, an ejector may be used. In this case, liquid state condensed water contained in the circulating fuel gas can be supplied to the stack directly, causing drops of the condensed water to block a portion of a channel of the stack. Thus, if the portion of the channel of the stack is blocked, a fuel gas supply rate to the portion of channel is reduced, and the entire stack can be deteriorated. Consequently, there have been ceaseless researches for removing the moisture being supplied to the stack.

The above information disclosed in this Background section is only for enhancement of understanding of the background of the disclosure, and therefore, it may contain information that does not form the prior art that is already known in this country to a person of ordinary skill in the art.

SUMMARY

The present disclosure provides a fuel cell system provided with an ejector having advantages of stable generation of electricity. An aspect of the present disclosure provides a fuel cell system having an ejector for making stable supply of fuel gas to a stack through the ejector, effective removal of condensed water drained from the ejector, and stable maintenance of humidity of the fuel gas being supplied to the stack.

According to an exemplary embodiment of the present disclosure, a fuel cell system having an ejector includes a stack for generating electricity by using air and fuel gas being supplied thereto. A fuel gas circulating line circulates the fuel gas from an outlet of the stack to an inlet of the stack. An ejector is mounted to the fuel gas circulating line for supplying fresh fuel gas and circulating the circulating fuel gas. The ejector includes a vacuum suction pipe having one side connected to the fuel gas circulating line. A fuel gas spray nozzle is mounted to the vacuum suction pipe for spraying the fuel gas to form a vacuum. An inner housing through which the fuel gas sprayed from the fuel gas spray nozzle passes. An outer housing is arranged on an outside of the inner housing to construct a condensed water space with the inner housing. The inner housing drains water from an inside of the inner housing to the condensed water space.

The inner housing may have at least one drain hole formed therein for draining the condensed water to the condensed water space.

The fuel cell system may further include a condensed water reservoir mounted to a fuel gas circulating line for collecting the condensed water drained from the condensed water space.

The fuel cell system may further include a condensed water drain pipe connected between the condensed water space and the condensed water reservoir.

The at least one drain hole may be formed at an end portion of a region where an inside diameter of the inner housing becomes the larger.

The at least one drain hole may have a slit shape extended along a circumference of the inner housing.

The fuel gas sprayed through the fuel gas spray nozzle may include hydrogen.

The inner housing may be a porous member which lets the water pass therethrough.

The inner housing itself may be a porous film, or an ion-exchange resin which lets the water pass therethrough.

The fuel gas circulating line, at least a portion thereof may include a flow passage formed therein for passing of the circulating fuel gas including a water pass inner pipe for passing the water from inside to an outside thereof, and an outer pipe formed to surround an outside of the water pass inner pipe to form a space therebetween, wherein the outer pipe is connected to the condensed water reservoir.

At least a portion of the water pass inner pipe may be formed of a porous member, or an ion-exchange resin.

At least one drain hole may be formed at a position matched to an end portion of the condensed water space.

The fuel cell of the present disclosure has the following advantages. Excessive supply of the water to the stack can be prevented effectively, and the problem of output deterioration caused by supply of the water to the stack can be reduced, drastically. Further, the reduction of blocked channel by the water at the stack reduces a difference of pressures between a front end/a rear end of the stack, to increase fuel gas circulating efficiency, and the positive humidifying of the fuel gas also increases the humidifying efficiency.

DETAILED DESCRIPTION OF THE EMBODIMENTS

An exemplary embodiment of the present disclosure will hereinafter be described in detail with reference to the accompanying drawings.

Figure 1:
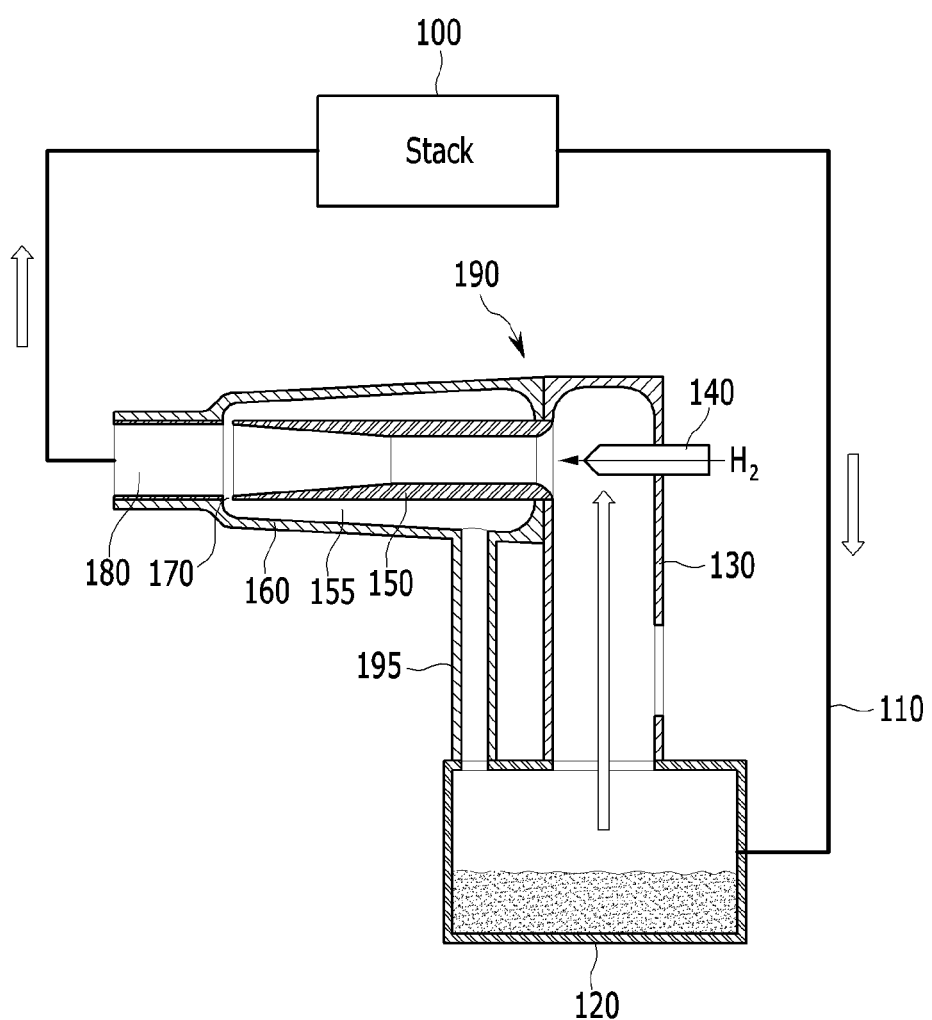
FIG. 1 illustrates a schematic view of a fuel cell system in accordance with an exemplary embodiment of the present disclosure.

FIG. 1 illustrates a schematic view of a fuel cell system in accordance with an exemplary embodiment of the present disclosure. Referring to FIG. 1, the fuel cell system includes a stack 100, a fuel gas circulating line 110, a condensed water reservoir 120, and an ejector 190. The ejector 190 includes a vacuum suction pipe 130, a fuel gas spray nozzle 140, an inner housing 150, an outer housing 160, and a condensed water drain pipe 195.

The fuel gas circulates to the stack 100 through the condensed water reservoir 120, the vacuum suction pipe 130, and the inner housing 150 which are arranged on the fuel gas circulating line 110, and an outlet 180 of the ejector 190, and the stack 100 generates electrical energy by using the fuel gas and air (no reference numeral is given) both being supplied thereto. In an exemplary embodiment of the present disclosure, since it is known, detailed description of a physiochemical principle of the stack 100 generating electricity will be omitted.

The fuel gas spray nozzle 140 is arranged in the vacuum suction pipe 130 for spraying the fuel gas, such as hydrogen, to a center portion of the inner housing 150 at a fast speed to form vacuum in the vacuum suction pipe 130. The vacuum formed thus draws the circulating fuel gas from the outlet of the stack 100, and supplies the circulating fuel gas to an inlet of the stack 100.

The inner housing 150 is arranged in the outer housing 160, an outside circumference of the inner housing 150 and an inside circumference of the outer housing 160 construct a condensed water space 155. The inner housing 150 has a slit 170 formed therein which serves as a drain hole connected to the condensed water space 155. The slit 170 is formed from an inside to an outside of the inner housing 150 for draining water formed in the inner housing 150 to the condensed water space 155.

The condensed water reservoir 120, arranged on the fuel gas circulating line 110, has one side of an upper side connected to the vacuum suction pipe 130, and the other side of the upper side connected to the outer housing 160 through the condensed water drain pipe 195. Accordingly, the condensed water collected to the condensed water space 155 is drained to the condensed water reservoir 120 through the condensed water drain pipe 195.

The fuel gas, which is circulated in the fuel gas circulating line 110, has humidity adjusted appropriately as the fuel gas passes through the condensed water reservoir 120, and the water formed at a rear end of the ejector 190 is collected to the condensed water reservoir 120 through the slit 170, the condensed water space 155, and the condensed water drain pipe 195. According to this, supply of excessive water to the stack 100 is prevented, effectively.

As shown, the slit 170 may be formed in the inner housing 150 at a point where the condensed water space 155 which is formed between the inner housing 150 and the outer housing 160 ends at an end portion of the inner housing of which the inner diameter gradually becomes larger.

Figure 2:
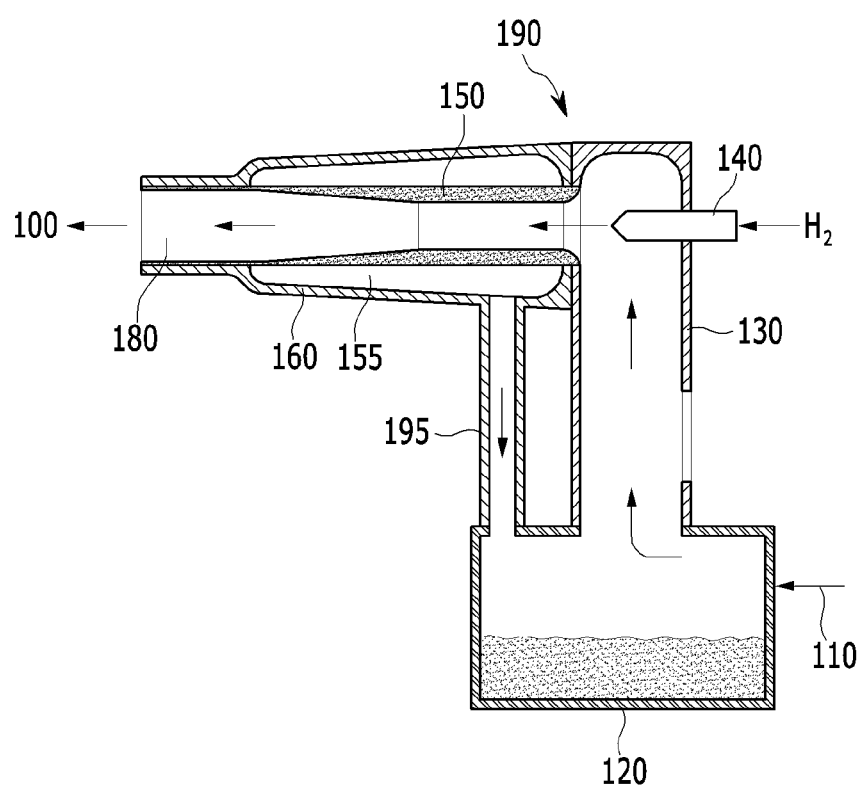
FIG. 2 illustrates a schematic view of a fuel cell system in accordance with another exemplary embodiment of the present disclosure.

FIG. 2 illustrates a schematic view of a fuel cell system in accordance with another exemplary embodiment of the present disclosure. Another exemplary embodiment of the present disclosure will be described with reference to FIG. 2 focused on parts different from the foregoing exemplary embodiment of the present disclosure described with reference to FIG. 1 while description of identical of similar parts are omitted.

Referring to FIG. 2, the inner housing 150 has no slit formed therein, and instead, the inner housing 150 may be formed of at least one selected from a porous member, a porous film, and an ion-exchange resin. The inner housing 150 of the porous member or the porous film prevents a pressure formed therein from leaking to an outside of the inner housing 150 while expelling only the water to the outside of the inner housing 150. Along with this, the inner housing 150 of the porous member or the porous film also serves to filter out foreign matter from the water.

The inner housing 150 of the ion-exchange resin also prevents the pressure in the inner housing 150 from dissipating to the outside of the inner housing 150 while draining the condensed water and collects ions contained in the water. The inner housing 150 has a structure in which the hydrogen (fuel gas) sprayed from the fuel gas spray nozzle 140 and the circulating fuel gas spiral-swirls, and the water having a large mass moves along the inner circumference of the inner housing 150 such that the water is dissipated through the porous member, the porous film, or the ion-exchange resin.

In an exemplary embodiment of the present disclosure, though it is described that the condensed water reservoir 120 is arranged on the fuel gas circulating line 110, the condensed water reservoir 120 may be provided separate from the fuel gas circulating line 110.

Figure 3:
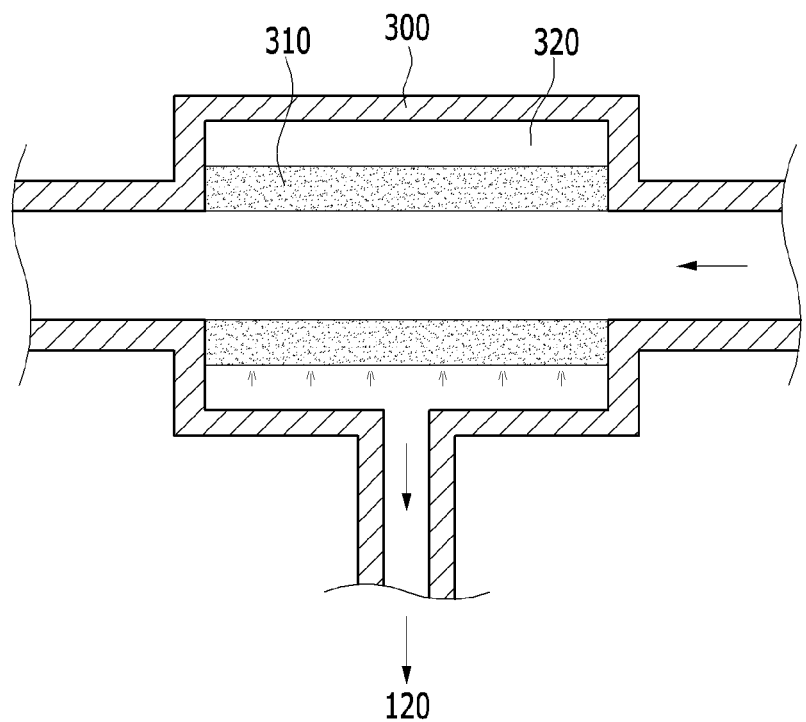
FIG. 3 illustrates a schematic view of a fuel cell system in accordance with another exemplary embodiment of the present disclosure.

FIG. 3 illustrates a schematic view of a fuel cell system in accordance with another exemplary embodiment of the present disclosure. Another exemplary embodiment of the present disclosure will be described with reference to FIG. 3 focused on parts different from the foregoing exemplary embodiments of the present disclosure described with reference to FIGS. 1 and 2 while description of identical of similar parts are omitted.

Referring to FIG. 3, in the fuel gas circulating line 110 through which the fuel gas circulates, a water pass inner pipe 310 is arranged in an outer pipe 300, to form a space 320 between the outer pipe 300 and the water pass inner pipe 310. As the circulating fuel gas circulates through the water pass inner pipe 310, the water is collected to the space 320 passed through the water pass inner pipe 310, and the water collected to the space 320 thus may be drained to the condensed water reservoir 120.

Eventually, excessive supply of the water to the stack 100 can be prevented effectively, and the problem of output deterioration caused by supply of the water to the stack 100 can be reduced, drastically.

While this disclosure has been described in connection with what is presently considered to be practical exemplary embodiments, it is to be understood that technical aspects of the present disclosure are not limited to the exemplary embodiments suggested in the specification, but, though a person of an ordinary skill in this field of art who understand the technical aspects of the present disclosure can suggest another exemplary embodiment by modifications, changes, removal, and addition of constituent elements within a range of technical aspects the same with the present disclosure, it may also be within a range of right of the present disclosure.

What is claimed is:

1. A fuel cell system having an ejector, comprising:
a stack for generating electricity by using air and fuel gas being supplied thereto;
a fuel gas circulating line for circulating the fuel gas from an outlet of the stack to an inlet of the stack; and
an ejector mounted to the fuel gas circulating line for supplying fresh fuel gas and circulating the fuel gas,
wherein the ejector includes:
a vacuum suction pipe having one side connected to the fuel gas circulating line,
a fuel gas spray nozzle mounted to the vacuum suction pipe for spraying the fuel gas to form a vacuum;
an inner housing through which the fuel gas sprayed from the fuel gas spray nozzle passes, and
an outer housing arranged on an outside of the inner housing to construct a condensed water space with the inner housing,
wherein the inner housing drains water from an inside of the inner housing to the condensed water space, and
wherein the inner housing is a porous member, a porous film, or an ion-exchange resin which lets the water pass therethrough.

2. The fuel cell system of claim 1, wherein the inner housing has at least one drain hole formed therein for draining the condensed water to the condensed water space.

3. The fuel cell system of claim 1, further comprising a condensed water reservoir mounted to the fuel gas circulating line for collecting the condensed water drained from the condensed water space.

4. The fuel cell system of claim 3, further comprising a condensed water drain pipe connected between the condensed water space and the condensed water reservoir.

5. The fuel cell system of claim 2, wherein the at least one drain hole is formed at an end portion of a region where an inside diameter of the inner housing becomes the larger.

6. The fuel cell system of claim 2, wherein the at least one drain hole has a slit shape extending along a circumference of the inner housing.

7. The fuel cell system of claim 1, wherein the fuel gas sprayed through the fuel gas spray nozzle includes hydrogen.

8. The fuel cell system of claim 1, wherein at least a portion of the fuel gas circulating line includes:
a flow passage formed therein for passing of the circulating fuel gas including;
a water pass inner pipe for passing the water from inside to an outside thereof, and
an outer pipe formed to surround an outside of the water pass inner pipe to form a space therebetween,
wherein the outer pipe is connected to the condensed water reservoir.

9. The fuel cell system of claim 8, wherein at least a portion of the water pass inner pipe is formed of a porous member or an ion-exchange resin.

10. The fuel cell system of claim 1, wherein at least one drain hole is formed at a position matched to an end portion of the condensed water space.

* * * * *